(12) United States Patent
Scheim et al.

(10) Patent No.: US 7,151,150 B2
(45) Date of Patent: Dec. 19, 2006

(54) ORGANOPOLYSILOXANE COMPOSITIONS AND THEIR USE IN LOW-MODULUS COMPOSITIONS WHICH CAN BE CROSSLINKED AT ROOM TEMPERATURE

(75) Inventors: Uwe Scheim, Coswig (DE); Wolfgang Ziche, Diera-Zehren (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 10/729,102

(22) Filed: Dec. 5, 2003

(65) Prior Publication Data
US 2004/0122199 A1    Jun. 24, 2004

(30) Foreign Application Priority Data
Dec. 19, 2002   (DE) ................ 102 59 613

(51) Int. Cl.
*C08G 77/26*    (2006.01)
(52) U.S. Cl. .................. 528/38; 528/901; 528/28; 525/474
(58) Field of Classification Search ................ 528/38, 528/28, 901; 525/474
See application file for complete search history.

(56) References Cited

U.S. PATENT DOCUMENTS

| | | | |
|---|---|---|---|
| 4,220,748 A | | 9/1980 | Hashimoto et al. |
| 4,317,762 A | * | 3/1982 | Kratel et al. ................ 523/203 |
| 4,472,551 A | | 9/1984 | White et al. |
| 4,483,973 A | * | 11/1984 | Lucas et al. ................. 528/21 |
| 4,495,331 A | | 1/1985 | Chung |
| 5,110,967 A | | 5/1992 | King et al. |
| 5,290,826 A | | 3/1994 | Palmer |
| 5,300,612 A | | 4/1994 | Saruyama |
| 5,470,934 A | | 11/1995 | Saruyama et al. |
| 6,018,011 A | | 1/2000 | Scheim et al. |
| 6,090,904 A | | 7/2000 | Körnes et al. |
| 6,254,811 B1 | * | 7/2001 | Finger et al. ................. 264/35 |

FOREIGN PATENT DOCUMENTS

| | | |
|---|---|---|
| DE | 1295834 | 5/1999 |
| DE | 19855619 | 6/2000 |
| DE | 101 21 514 A1 | 11/2002 |
| EP | 0 885 915 | 12/1998 |
| EP | 0 074 001 | 6/2000 |
| JP | 63-83167 | 4/1998 |

OTHER PUBLICATIONS

Freeman, Silicones, Published for the Plastics Institute, 1962, p. 27.*
Patent Abstract of Japan, vol. 0123, No. 12 (C-523), Aug. 24, 1998 (corres. to JP 63-083 167).
English Derwent Abstract AN 1968-27002 Q [00] corresp. to DE 1295834.
English Derwent Abstract AN 1983-27713K [12] corresp. to EP 0 074 001.
English Derwent Abstract AN 2000-378259 [33] corresp. to DE 198 55 619.
English Derwent Abstract AN corresp. to DE 10121514.
English Derwent Abstract 1988, Ref. 88-142747/21 corresp. to JP 63-83167.
English Derwent Abstract 1988, Ref. 88-1427476/21 corresp. to JP 63-83166.
High Molecular Report 1985, Ref. H 104 65/85 corresp. to U.S. 4,472,551 A.
Chemical Abstracts 1985, Ref. 102:114957x corresp. to U.S. 4,495,331 A.
High Molecular Report 1981, Ref. H 104 8691/81 corresp. to U.S. 4,220,748 A.

* cited by examiner

*Primary Examiner*—Kuo-Liang Peng
(74) *Attorney, Agent, or Firm*—Brooks Kushman P.C.

(57) ABSTRACT

Organopolysiloxane compositions obtainable by reaction of (a) essentially linear organopolysiloxanes which are terminated at both ends by Si-bonded hydroxy groups, (b) optionally, plasticizers, (c) at least one dialkylaminomethylalkyldialkoxysilane chain extender and/or partial hydrolysate thereof, (d) at least one deactivator, (e) optionally, one or more alkyltrialkoxysilanes and/or partial hydrolysates thereof, and (f) optionally, catalysts for accelerating the reaction of silane (e) with Si—OH groups, are useful in low-modulus compositions which can be crosslinked at room temperature, in particular, compositions which crosslink with elimination of alcohols.

11 Claims, No Drawings

ORGANOPOLYSILOXANE COMPOSITIONS AND THEIR USE IN LOW-MODULUS COMPOSITIONS WHICH CAN BE CROSSLINKED AT ROOM TEMPERATURE

BACKGROUND OF THE INVENTION

1. Field of the Invention

The invention relates to organopolysiloxane compositions, to their preparation and to their use in low-modulus compositions which can be crosslinked at room temperature, in particular, compositions which crosslink with elimination of alcohols.

2. Background Art

Single-component silicone rubber mixtures (RTV-1) which can be stored in the absence of water, but which can be vulcanized at room temperature when exposed to water to form elastomers are known. These products are used in large amounts, for example as joint sealants in the building industry. These RTV-1 mixtures are based on polydiorganosiloxanes which are terminated either by OH groups or by silyl groups bearing hydrolyzable groups. Significant properties of the RTV-1 mixtures can be influenced via the chain length of the polymers. In particular the modulus, i.e. the stress at 100% elongation of a cured test specimen, can be regulated via the chain length. In the case of joint sealants in particular, it is desirable for the modulus to be low, so that only very low forces can act on the sides of the joint. However, only a restricted range of polymer chain lengths is available for the production of RTV-1 mixtures for economic and technical reasons. In particular, the large chain lengths required for very low-modulus sealants lead to very high viscosities of the polymers, so that such products can be handled only with difficulty. It is therefore desirable to produce low modulus elastomers from easily processable polymers having relatively short chain lengths and therefore relatively low viscosities for the preparation of RTV compositions.

To increase the chain length and hence also the viscosity of the polysiloxanes and thus to decrease the modulus of RTV-1 elastomers produced therefrom, relatively long polymers can be produced from shorter polymers by chain extension. It is known that bifunctional silanes or siloxanes of sufficiently high reactivity can be used for this purpose. Thus, U.S. Pat. No. 5,110,967 describes Si—N-heterocyclic silanes. However, such silanes require specific crosslinkers in the formulation of RTV compositions. Compounds such as bisacetamidosilane (cf., for example, U.S. Pat. No. 5,290,826), bisacetoxysilane (cf., for example, DE-A 12 95 834) or bisaminosilane (cf., for example, EP-A 74 001) liberate elimination products which pose health concerns or are corrosive during vulcanization. For this reason, an alcohol is very frequently preferred as an elimination product during condensation, but dialkoxysilanes and dialkoxysiloxanes such as those described in U.S. Pat. Nos. 5,300,612 and 5,470,934 are unsuitable for a rapid reaction with silanol-terminated siloxanes. The same applies to alkoxysilanes having two alkoxy groups, which do not exhibit chain extension, and which are described in DE-A 198 55 619.

Furthermore, the use of α-aminomethyldialkoxymethylsilanes for chain extension, for example, N,N-dibutylaminomethylmethyldiethoxysilane, is known. Reference may be made, for example, to JP-A 63083167. Although these silanes initially undergo a rapid reaction with the hydroxy-terminated polysiloxanes, the resulting polymer is degraded again in the presence of substances containing active hydrogen, e.g. alcohols, which are always present when the polymers are used in RTV compositions, leading either to the chain extension being reversed and thus made ineffective, or to the polymer being damaged to such an extent that the RTV-1 compositions no longer vulcanize.

A further problem encountered with RTV-1 compositions is their stability over a prolonged period of storage. In the case of RTV-1 compositions which cure by elimination of alcohols, it is particularly difficult to obtain storage-stable products. A number of approaches have been tried to solve the problem. One approach is to remove all OH-containing compounds from the mixtures by means of scavengers, examples of which are isocyanates (cf. U.S. Pat. No. 4,495,331). The isocyanates react with the troublesome OH-containing components to form urethanes which do not adversely affect the storage stability. However, it is necessary for the isocyanates to be used in an effective amount, i.e. at least the amount which is stoichiometrically required for reaction with all OH-containing compounds has to be added. Since this is normally not known precisely for industrial mixtures, a significant excess of scavenger is used in order to be certain that all OH-containing components are indeed reacted.

A further method of increasing storage stability is to add stabilizing components, for example phosphorus compounds, which form complexes with the organotin compounds normally used as curing catalysts (cf. DE-A 101 21 514).

SUMMARY OF THE INVENTION

Organopolysiloxane compositions which are storage stable in the absence of moisture, curable with elimination of alcohols into low modulus elastomers, and yet which employ hydroxyl-terminated organopolysiloxanes of low viscosity, include a chain extender and a deactivator, the chain extender comprising a (dialkylaminomethyl)(alkyl)dialkoxysilane, or a hydrolysis product thereof.

DETAILED DESCRIPTION OF THE PREFERRED EMBODIMENT(S)

The invention accordingly provides organopolysiloxane compositions which are curable to provide low modulus elastomers, comprising (a) essentially linear organopolysiloxanes which are terminated at both ends by Si-bonded hydroxy groups, (b) if desired, plasticizers, (c) at least one chain extender of the formula

and/or partial hydrolysates thereof, where $R^1$ are identical or different and are each a monovalent, substituted or unsubstituted hydrocarbon radical, $R^2$ are identical or different and are each a monovalent, substituted or unsubstituted hydrocarbon radical and $R^6$ are identical or different and are each hydrogen or a monovalent, substituted or unsubstituted hydrocarbon radical, (d) at least one deactivator, (e) if desired, silanes of the formula

and/or their partial hydrolysates, where $R^3$ is as defined for $R^1$, $R^4$ are identical or different and are each a monovalent, substituted or unsubstituted hydrocarbon radical or a —C(=O)—$R^5$ or —N=C$R^5{}_2$ radical where $R^5$ are identical or different and each have one of the meanings given for $R^2$, and (f) if desired, one or more catalysts for accelerating the reaction of silane (e) with Si—OH groups, or a reaction product obtained by the admixture of the above ingredients.

For the purposes of the present invention, the term organopolysiloxanes encompasses polymeric, oligomeric and also dimeric siloxanes, in which a portion of the silicon atoms may be bound to one another via groups other than oxygen, for example via —N— or —C—.

The hydroxy-terminated organopolysiloxanes (a) are preferably those of the formula $$HO(R_2SiO)_nH \quad (III),$$

where

R are identical or different and each has one of the meanings given for $R^1$, and n is an integer from 10 to 2000, preferably from 100 to 1000.

Examples of radicals R, $R^1$, $R^2$, $R^3$, $R^4$, $R^5$ and $R^6$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, and dodecyl radicals such as the n-dodecyl radical; cycloalkyl radicals such as the cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl radical; alkaryl radicals, such as o-, m-, p-tolyl radicals; and aralkyl radicals such as the benzyl radical and the α- and β-phenylethyl radicals. Further examples of the group —$OR^4$ in formula (II) are acetoxy and ethylmethylketoximo groups.

Examples of substituted radicals R, $R^1$, $R^2$, $R^3$, $R^4$, $R^5$ and $R^6$ are haloalkyl radicals such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radicals, and also all above-mentioned radicals which may be substituted by mercapto groups, epoxy-functional groups, carboxyl groups, keto groups, enamine groups, amino groups, aminoethylamino groups, isocyanato groups, aryloxy groups, acryloxy groups, methacryloxy groups, hydroxy groups and halo groups.

The radicals R, $R^1$, $R^2$, $R^3$, $R^4$ and $R^5$ are each preferably, in each case independently of one another, monovalent hydrocarbon radicals which have from 1 to 12 carbon atoms and may be substituted by heteroatoms such as nitrogen, halogen and oxygen. In addition, $R^4$ can be a radical of the structure —C(=O)—$R^5$ or —N=$CR^5_2$, where $R^5$ is as defined above.

The radical $R^6$ is preferably a hydrogen atom or a radical indicated above for R and is most preferably a hydrogen atom.

The radicals R, $R^3$ and $R^5$ are most preferably hydrocarbon radicals having from 1 to 6 carbon atoms, in particular methyl, ethyl or vinyl radicals.

The radicals $R^2$ and $R^4$ are most preferably alkyl radicals having from 1 to 6 carbon atoms, in particular methyl or ethyl radicals.

The compositions of the invention can be prepared by any methods known per se, for instance by simply mixing the individual compounds and allowing them to react.

The present invention further provides a process for preparing the organopolysiloxane compositions of the invention, which comprises mixing (a) essentially linear organopolysiloxanes which are terminated at both ends by Si-bonded hydroxy groups, (b) if desired, plasticizers, (c) at least one chain extender of the formula (I), (d) at least one deactivator, (e) if desired, silanes of the formula (II), and (f) if desired, one or more catalysts for accelerating the reaction of silane (e) with Si—OH groups with one another, and allowing the ingredients to react.

The process of the invention is preferably carried out at temperatures of preferably from 5 to 100° C., more preferably at room temperature, i.e. about 20° C., and preferably at the pressure of the surrounding atmosphere, i.e. from about 900 to 1100 hPa.

A preferred way of carrying out the process of the invention is as follows: in a first step, dihydroxy-terminated organopolysiloxanes (a) are mixed with any plasticizer (b) used, and reacted with silanes (c) of the formula (I) and/or their partial hydrolysates and after a reaction time, in a second step, deactivator (d) is added and, if desired, in a third step, Si—OH groups still present are reacted, preferably completely, by addition of silanes (e) of the formula (II) and/or their partial hydrolysates and, if desired, catalyst (f).

In a further preferred way of carrying out the process of the invention, a mixture of the chain extender (c) with the deactivator (d) and, if desired, the silane (e) and, if desired, the catalyst (f) are added to a mixture of dihydroxy-terminated organopolysiloxanes (a) with any plasticizer (b) used.

Compounds which are useful as constituent (a) are preferably organopolysiloxanes of the formula (III), in particular α,ω-dihydroxypolydimethylsiloxanes having viscosities of from 100 to 500,000 mPas, more preferably from 20,000 to 120,000 mPas, in each case at 25° C.

The plasticizers (b) which may be used are preferably silicone oils which are different from component (a) and have viscosities of from 5 to 10,000 mPas at 25° C., and hydrocarbon mixtures having viscosities of from 1 to 20 mPas at 40° C., with particular preference being given to silicone oils, in particular dimethylpolysiloxanes having trimethylsilyl end groups and having viscosities of from 10 to 1000 mPas. If plasticizers (b) are used in the process of the invention, they are preferably used in amounts of from 5 to 100 parts by weight, more preferably from 15 to 70 parts by weight, in each case based on 100 parts by weight of component (a).

Examples of chain extenders (c) used according to the invention are $(CH_3—(CH_2)_3)_2N—CH_2—Si(CH_3)(OCH_2CH_3)_2$, $(H_3C—CH_2)_2N—CH_2—Si(CH_3)(OCH_2CH_3)_2$, $(CH_3—(CH_2)_3)_2N—CH_2—Si(CH_3)(OCH_3)_2$, $(H_3C—CH_2)_2N—CH_2—Si(CH_3)(OCH_3)_2$, $((CH_3)_2CH)_2N—CH_2—Si(CH_3)(OCH_2CH_3)_2$, $((CH_3)_2CH)_2N—CH_2—Si(CH_3)(OCH_3)_2$, $(CH_3CH_2(CH_3)CH)_2N—CH_2—Si(CH_3)(OCH_2CH_3)_2$, $(CH_3CH_2(CH_3)CH)_2N—CH_2—Si(CH_3)(OCH_3)_2$, $C_6H_5(CH_3)N—CH_2—Si(CH_3)(OCH_2CH_3)_2$, $C_6H_5(CH_3)N—CH_2Si(CH_3)(OCH_3)_2$, $C_6H_{11}(CH_3)N—CH_2—Si(CH_3)(OCH_2CH_3)_2$, $C_6H_{11}(CH_3)N—CH_2—Si(CH_3)(OCH_3)_2$ and their partial hydrolysates.

The chain extenders (c) used according to the invention are preferably $(CH_3—(CH_2)_3)_2N—CH_2—Si(CH_3)(OCH_2CH_3)_2$, $(H_3C—CH_2)_2N—CH_2—Si(CH_3)(OCH_2CH_3)_2$, $(CH_3—(CH_2)_3)_2N—CH_2—Si(CH_3)(OCH_3)_2$ and $(H_3C—CH_2)_2N—CH_2—Si(CH_3)(OCH_3)_2$ and their partial hydrolysates, with particular preference being given to $(H_3C—CH_2)_2N—CH_2—Si(CH_3)(OCH_2CH_3)_2$ and $(H_3C—CH_2)_2N—CH_2—Si(CH_3)(OCH_3)_2$.

To prepare the compositions of the invention, chain extenders (c) are preferably used in such amounts relative to the component (a) that the molar ratio Si—OH/OR$^2$ is greater than or equal to 1, where R$^2$ is as defined above.

Examples of deactivators (d) which may be employed are isocyanates such as cyclohexyl isocyanate, isophorone diisocyanate or hexamethylene diisocyanate. The molar amount of deactivator (d) employed is preferably from 10 to 200%, particularly preferably from 70 to 150%, in each case based on the molar amount of chain extender (c) used.

Examples of silanes (e) which may be used include organotrialkoxysilanes such as methyltrimethoxysilane, ethyltrimethoxysilane, n-propyltrimethoxysilane and vinyltrimethoxysilane, organotrioximosilanes, such as methyltris(methylethylketoximo)silane and vinyltris(methylethylketoximo)silane, and alkyltriacetoxysilanes such as methyltriacetoxysilane and ethyltriacetoxysilane, and also the partial hydrolysates of the abovementioned silanes, with preference being given to organotrialkoxysilanes and/or their partial hydrolysates. The silanes (e) are most preferably methyltrimethoxysilane and vinyl trimethoxysilane.

If silanes (e) and/or their partial hydrolysates are used in preparing the compositions of the invention, they are preferably used in amounts of from 1 to 20 parts by weight, more preferably from 5 to 15 parts by weight, in each case based on 100 parts by weight of organopolysiloxane (a).

Examples of catalysts (f) which may be used are all catalysts which have been used hitherto, or which are later developed, which promote the reaction of Si-bonded organooxy groups with Si—OH groups. The catalysts (f) are preferably metal chelates and phosphoric esters, more preferably titanium chelates, zinc acetylacetonate, 2-ethylhexyl phosphate and di(2-ethylhexyl) phosphate.

If catalysts (f) are used, they are preferably employed in amounts of from 0.0001 to 5 parts by weight, more preferably from 0.001 to 2 parts by weight, in each case based on 100 parts by weight of hydroxy-terminated organopolysiloxanes (a) used.

The components used in the process of the invention can each be one type of such a component or a mixture of two or more types of the respective component.

The process of the invention can be carried out in one reaction vessel. However, the individual steps of the process of the invention can also be carried out separately.

Elimination products of the formula R$^2$—OH and, if applicable, R$^4$—OH, where R$^2$ and R$^4$ are as defined above, are formed during the reaction and can remain in the reaction mixture or be removed by known methods. Overall, a production process which exclusively comprises rapid reactions is obtained, so that the process of the invention can be carried out either continuously or batchwise.

The process has the advantage that it is quick and simple to carry out, and uses readily available raw materials as starting materials. A further advantage of the process is that the resulting organopolysiloxane mixtures can be directly used further, e.g. in the preparation of RTV compositions.

The organopolysiloxane compositions of the invention preferably have a viscosity of from 100 to 1,000,000 mPa·s, more preferably from 100 to 50,000 mPa·s, in particular from 1,000 to 20,000 mPa·s, in each case measured at 25° C.

It has surprisingly been found that the organopolysiloxane compositions of the invention have a high stability in respect of polymer degradation during storage, and therefore can be used for preparing condensation-crosslinking compositions without polymer degradation occurring.

The organopolysiloxane compositions of the invention or those able to be prepared according to the invention can be used for all purposes for which organopolysiloxanes have also been used hitherto. In particular, they are suitable for preparing compositions which can be crosslinked at room temperature.

The present invention further provides compositions which can be crosslinked by means of condensation reactions and which comprise organopolysiloxane compositions according to the invention or able to be prepared according to the invention.

The crosslinkable compositions of the invention can comprise, in addition to the organopolysiloxane compositions of the invention, all components which have also been used hitherto for preparing organopolysiloxane compositions which can be crosslinked at room temperature, in other words, RTV compositions. The hydrolyzable groups which may be borne by the organosilicon compounds used which participate in the crosslinking reaction can be any groups, for example acetoxy groups, amino groups, aminoxy groups, oximato groups and organooxy groups such as ethoxy radicals, alkoxyethoxy radicals and methoxy radicals. The compositions which can be crosslinked at room temperature are preferably one-component compositions (RTV-1) which can be crosslinked by means of organooxy groups.

Examples of components which can be used in the preparation of the RTV compositions of the invention are condensation catalysts, reinforcing fillers, nonreinforcing fillers, pigments, soluble dyes, fragrances, plasticizers such as dimethylpolysiloxanes which are terminated by trimethylsiloxy groups and are liquid at room temperature, phosphoric esters, fungicides, resin-like organopolysiloxanes including those comprising $(CH_3)_3SiO_{1/2}$ and $SiO_{4/2}$ units, purely organic resins such as homopolymers or copolymers of acrylonitrile, styrene, vinyl chloride or propylene, where such purely organic resins, in particular copolymers of styrene and n-butyl acrylate, may have been produced by polymerization of the monomers mentioned by means of free radicals in the presence of a diorganopolysiloxane having an Si-bonded hydroxyl group in each of the terminal units, corrosion inhibitors, polyglycols which may be esterified or etherified, oxidation inhibitors, stabilizers, heat stabilizers, solvents, agents for influencing the electrical properties, e.g. conductive carbon black, flame retardants, light stabilizers and agents for prolonging the skin formation time, e.g. silanes bearing SiC-bonded mercaptoalkyl radicals, and also cell generating agents, e.g. azodicarbonamide. Likewise, adhesion promoters, preferably aminoalkyl-functional silanes such as 3-aminopropyltriethoxysilane, can be added.

Examples of stabilizers which may be used for preparing the crosslinkable compositions of the invention are acid phosphoric esters, phosphonic acids and acid phosphonic esters. If stabilizers are used for preparing the crosslinkable compositions, they are preferably used in amounts of from 0.01 to 1 part by weight, based on 100 parts by weight of hydroxy-terminated organopolysiloxanes (a) used for preparing the component (a). Such stabilizers are most preferably used in compositions which crosslink via organooxysilanes.

Condensation catalysts are preferably used in the preparation of the crosslinkable compositions of the invention. These can be, for example, any condensation catalysts which have hitherto been used in compositions which are storage-stable in the absence of water and crosslinked at room temperature in the presence of water to form elastomers, or which may be later developed. Examples of such condensation catalysts are organic compounds of tin, zinc, zirconium, titanium and aluminum. Among these condensation catalysts, preference is given to butyl titanates and organic tin compounds such as di-n-butyltin diacetate, di-n-butyltin dilaurate and reaction products of a silane bearing at least two monovalent hydrocarbon radicals which are bound to silicon via oxygen and may bear an alkoxy group as a substituent per molecule as a hydrolyzable group or an oligomer thereof with a diorganotin diacylate, where all valences of the tin atoms in these reaction products are occupied by oxygen atoms of the grouping ≡SiOSn≡ or by SnC-bonded, monovalent organic radicals.

The RTV compositions preferably also comprise fillers. Examples of fillers are nonreinforcing fillers, i.e. fillers having a BET surface area of up to 20 m$^2$/g, e.g. quartz, diatomaceous earth, calcium silicate, zirconium silicate, zeolites, metal oxide powders such as aluminum, titanium, iron or zinc oxides and their mixed oxides, barium sulfate, ground calcium carbonate, gypsum, silicon nitride, silicon carbide, boron nitride, glass powder and polymer powders such as polyacrylonitrile powder; reinforcing fillers, i.e. fillers having a BET surface area of more than 20 m$^2$/g, e.g. pyrogenic silica, precipitated silica, precipitated calcium carbonate, carbon black such as furnace black and acetylene black, and silicon-aluminum mixed oxides having a large BET surface area; and fibrous fillers such as asbestos and synthetic fibers.

The fillers mentioned can have been hydrophobicized, for example by treatment with organosilanes or organosiloxanes, with stearic acid, or by etherification of hydroxyl groups to form alkoxy groups. When only reinforcing silica is used as filler, transparent RTV compositions can be produced.

The components used for preparing the crosslinkable compositions of the invention can each be one type of such a component or a mixture of at least two types of the respective component.

The crosslinkable compositions of the invention are preferably compositions comprising:
(A) organopolysiloxane compositions according to the invention,
(B) if desired crosslinkers having at least three hydrolyzable radicals,
(C) condensation catalysts and
(D) filler.

If no silane (e) has been used for preparing the organopolysiloxane composition (A), crosslinkers (B) are used for preparing the crosslinkable compositions of the invention.

The crosslinkable compositions of the invention more preferably are compositions comprising:
(A) 100 parts by weight of an organopolysiloxane composition according to the invention,
(B) from 0 to 10 parts by weight of silanes having at least three alkoxy radicals and/or their partial hydrolysates,
(C) from 0.01 to 3 parts by weight of condensation catalysts,
(D) from 0.5 to 200 parts by weight of filler, and
(E) from 0.1 to 5 parts by weight of additives selected from among pigments, dyes, fragrances, corrosion inhibitors, polyglycols which may be esterified or etherified, oxidation inhibitors, heat stabilizers, stabilizers, solvents, and organo-functional silanes as adhesion promoters, with the proviso that the crosslinkable compositions comprise crosslinkers (B) when no silane (e) is used for preparing the organopolysiloxane composition (A).

The crosslinkable compositions of the invention can be prepared in any way known to date, e.g. by simply mixing the individual components, with the novel organopolysiloxane composition used as component (A) being able to be prepared in situ.

The usual water content of the air is sufficient for crosslinking the RTV compositions of the invention. Crosslinking can, if desired, also be carried out at temperatures above or below room temperature, e.g. at from −5 to 10° C. or at from 30 to 50° C. Crosslinking is preferably carried out at the pressure of the surrounding atmosphere, i.e. from about 900 to 1100 hPa.

The present invention further provides shaped bodies produced by crosslinking of the crosslinkable compositions of the invention.

The crosslinkable compositions of the invention can be used for all purposes for which compositions which can be crosslinked by means of condensation reactions at room temperature have also been used hitherto. They are thus, for example, very useful as sealing compositions for joints, including vertical joints, and similar empty spaces, e.g. in buildings or terrestrial vehicles, boats and aircraft, or as adhesives or putty compositions, e.g. in the installation of windows or in the production of showcases, and for producing protective coatings or rubber-elastic shaped bodies and also for the insulation of electrical or electronic equipment. The RTV compositions of the invention are particularly useful as low-modulus sealing compositions for joints which can accommodate a high degree of movement.

In the examples described below, all parts and percentages are by weight unless indicated otherwise. Furthermore, all viscosities reported are at a temperature of 25° C., unless indicated otherwise. Unless indicated otherwise, the following examples are carried out at the pressure of the surrounding atmosphere, i.e. at about 1000 hPa, and room temperature, i.e. at about 20° C., or at the temperature which is established on combining the reactants at room temperature without additional heating or cooling. The Shore A hardness is determined in accordance with DIN 53505-87 (German Standard). The elongation at break, tensile strength and stress at 100% elongation are determined in accordance with DIN 53504-85S2.

EXAMPLE 1

500 parts by weight of an α,ω-dihydroxy-dimethylpolysiloxane having a viscosity of 1000 mPa·s and 500 parts by weight of a trimethylsilyl-terminated dimethylpolysiloxane having a viscosity of 100 mPa·s are mixed with 4 parts by weight of a silane of the formula $(C_2H_5)_2N—CH_2—Si(CH_3)(OCH_2CH_3)_2$ in a planetary mixer and the viscosity $\eta^1$ is determined and is reported in Table 1. This polymer mixture is admixed with 2 parts by weight of cyclohexyl isocyanate, and after 5 minutes, 30 parts by weight of methyltrimethoxysilane and 0.15 part by weight of zinc acetylacetonate as catalyst are added. The viscosity is measured over time and is reported as η in Table 1.

Comparative Example 1

500 parts by weight of an α,ω-dihydroxy-dimethylpolysiloxane having a viscosity of 1000 mPa·s and 500 parts by weight of a trimethylsilyl-terminated dimethylpolysiloxane having a viscosity of 100 mPa·s are mixed with 4 parts by weight of a silane of the formula $(CH_3CH_2)_2N—CH_2—Si(CH_3)(OCH_2CH_3)_2$ in a planetary mixer and the viscosity $\eta^1$ is determined and is reported in Table 1. 30 parts by weight of methyltrimethoxysilane and 0.15 part by weight of zinc acetylacetonate as catalyst are then added. The viscosity is measured over time and is reported as η in Table 1.

TABLE 1

Viscosity in mPa · s

|  | Example 1 | Comparative Example 1 |
|---|---|---|
| $\eta^1$ | 1300 | 560 |
| η after 2 hours | 990 | 80 |
| η after 2 days | 960 | 200 |
| η after 3 days | 860 | 170 |

EXAMPLE 2

In a planetary mixer, 1400 g of an α,ω-dihydroxy-dimethylpolysiloxane having a viscosity of 80,000 mPa·s and 600 g of a trimethylsilyl-terminated dimethylpolysiloxane having a viscosity of 100 mPa·s are mixed with 1.2 g of N,N-diethylaminomethylmethyldiethoxysilane and the mixture is stirred for 5 minutes. This polymer mixture is admixed with 1.0 g of cyclohexyl isocyanate, and after 5 minutes, a mixture of 50 g of methyltrimethoxysilane, 25 g of vinyltrimethoxysilane and 0.6 g of zinc acetylacetonate is added. After 24 hours, an RTV-1 mixture is prepared by addition of 16 g of 3-aminopropyltrimethoxysilane, 43 g of the adhesion promoter "AMS 70" (commercially available from Wacker-Chemie GmbH, Germany), 220 g of a pyrogenic silica having a BET surface area of 150 m²/g and 8 g of a tin catalyst prepared by reaction of di-n-butyltin diacetate and tetraethoxysilane, and also 3 g of octylphosphonic acid. The composition obtained in this way is applied in a thickness of 2 mm to a PE film and stored at 23° C./50% relative atmospheric humidity. After curing for 7 days, the following mechanical properties were measured:
Tensile strength: 1.01 MPa
Elongation at break: 760%
Stress at 100% elongation: 0.25 MPa
Shore A hardness: 17

To determine the storage stability, the uncured RTV-1 composition was stored at 100° C. for 3 days. The mechanical properties subsequently measured on the vulcanized composition were unchanged.

EXAMPLE 3

In a planetary mixer, 1400 g of an α,ω-dihydroxy-dimethylpolysiloxane having a viscosity of 80,000 mPa·s and 600 g of a trimethylsilyl-terminated dimethylpolysiloxane having a viscosity of 100 mPa·s are mixed with a mixture consisting of 1.2 g of N,N-diethylaminomethyl-methyldiethoxysilane, 1.0 g of cyclohexyl isocyanate, 50 g of methyltrimethoxysilane, 25 g of vinyltrimethoxysilane and 0.6 g of zinc acetyl acetonate. After 24 hours, an RTV-1 mixture is prepared by addition of 16 g of 3-aminopropyltrimethoxysilane, 43 g of the adhesion promoter "AMS 70" (commercially available from Wacker-Chemie GmbH, Germany), 220 g of a pyrogenic silica having a BET surface area of 150 m²/g and 8 g of a tin catalyst prepared by reaction of di-n-butyltin diacetate and tetraethoxysilane, and also 3 g of octylphosphonic acid. The composition obtained in this way is applied in a thickness of 2 mm to a PE film and stored at 23° C./50% relative atmospheric humidity. After curing for 7 days, the following mechanical properties were measured:
Tensile strength: 1.08 MPa
Elongation at break: 780%
Stress at 100% elongation: 0.28 MPa
Shore A hardness: 17

To determine the storage stability, the uncured RTV-1 composition was stored at 100° C. for 3 days. The mechanical properties subsequently measured on the vulcanized composition were unchanged.

Comparative Example 2

The procedure described in Example 3 is repeated with the modification that the addition of the cyclohexyl isocyanate is omitted. The following mechanical properties were obtained:
Tensile strength: 1.22 MPa
Elongation at break: 580%
Stress at 100% elongation: 0.38 MPa
Shore A hardness: 22

Comparative Example 3

The procedure described in Example 3 is repeated with the modification that the addition of the N,N-diethylaminomethylmethyldiethoxysilane is omitted. The following mechanical properties were obtained:
Tensile strength: 1.47 MPa
Elongation at break: 511%
Stress at 100% elongation: 0.42 MPa
Shore A hardness: 26

EXAMPLE 4

In a planetary mixer, 500 parts by weight of an α,ω-dihydroxy-dimethylpolysiloxane having a viscosity of 80,000 mPa·s and 300 parts by weight of a trimethylsilyl-terminated dimethylpolysiloxane having a viscosity of 100 mPa·s are mixed with 0.1 part by weight of a silane of the formula $(CH_3CH_2)_2N-CH_2-Si(CH_3)(OCH_2CH_3)_2$ and the mixture is stirred for 5 minutes. This polymer mixture is admixed with 0.07 part by weight of cyclohexyl isocyanate, and after 5 minutes 30 parts by weight of ethyltriacetoxysilane are added. A stiff RTV preparation is produced by compounding with 85 parts by weight of a pyrogenic silica having a BET surface area of 150 m²/g and 0.01 part by weight of dibutyltin diacetate. The composition is applied in a thickness of 2 mm to a PE film and stored at 23° C./50% relative atmospheric humidity. The skin formation time is 10 minutes, and the composition cures all through within 24 hours and gives an elastic low-modulus vulcanized material.

EXAMPLE 5

In a planetary mixer, 500 parts by weight of an α,ω-dihydroxy-dimethylpolysiloxane having a viscosity of 80,000 mPa·s and 300 parts by weight of a trimethylsilyl-terminated dimethylpolysiloxane having a viscosity of 100 mPa·s are mixed with 0.2 part by weight of a silane of the formula $(CH_3CH_2)_2N-CH_2-Si(CH_3)(OCH_2CH_3)_2$ and the mixture is stirred for 5 minutes. This polymer mixture is admixed with 0.15 parts by weight of cyclohexyl isocyanate. The organopolysiloxane composition obtained in this way is subsequently admixed with 30 parts by weight of methyltris(methylethylketoximo)silane, 10 parts by weight of vinyltris(methylethylketoximo)silane and 5 parts by weight of 3-aminopropyltrimethoxysilane. A stiff RTV preparation is produced by compounding with 85 parts by weight of a pyrogenic silica having a BET surface area of 150 m²/g and 0.1 part by weight of dibutyltin diacetate. The composition is applied in a thickness of 2 mm to a PE film and stored at 23° C./50% relative atmospheric humidity. The skin formation time is 10 minutes, and the composition cures all through within 24 hours and gives an elastic low-modulus vulcanized material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing an organopolysiloxane composition, comprising mixing components:
   (a) essentially linear organopolysiloxanes which are terminated at both ends by Si-bonded hydroxy groups,
   (b) optionally, plasticizers,
   (c) at least one chain extender of the formula (I), $$R^1{}_2NCR^6{}_2SiR^1(OR^2)_2 \qquad (I)$$

and/or partial hydrolysates thereof, where
   $R^1$ are identical or different and are each a monovalent, substituted or unsubstituted hydrocarbon radical,
   $R^2$ are identical or different and are each a monovalent, substituted or unsubstituted hydrocarbon radical and
   $R^6$ are identical or different and are each hydrogen or a monovalent, substituted or unsubstituted hydrocarbon radical,
   (d) at least one organic isocyanate deactivator,
   (e) optionally, one or more silanes of the formula (II)

$$R^3Si(OR^4)_3 \qquad (II)$$

and/or their partial hydrolysates, where
   $R^3$ is as defined for $R^1$,
   $R^4$ are identical or different and are each a monovalent, substituted or unsubstituted hydrocarbon radical or a —C(=O)—$R^5$ or —N=$CR^5{}_2$ radical and
   $R^5$ are identical or different and each have one of the meanings given for $R^2$, and
   (f) optionally, catalyst(s) for accelerating the reaction of silane (e) with Si—OH groups, and allowing components to react,
   wherein, in a first step, dihydroxy-terminated organopolysiloxanes (a) are mixed with any plasticizer (b) used and reacted with silanes (c) of the formula (I) and/or their partial hydrolysates, and after a reaction time, in a second step, at least one deactivator (d) is added, and optionally, in a third step, Si—OH groups still present are reacted by addition of silane(s) (e) of the formula (II) and/or their partial hydrolysates, and optionally, catalyst (f), and wherein the organic isocyanate deactivator is present in an amount of 0.0084 to 0.2 weight percent based on the weights of components a)–f).

2. The process of claim 1, wherein said Si—OH groups still present are completely reacted with said silane(s) (e).

3. The process of claim 1, further comprising adding an aminoalkylsilane adhesion promoter.

4. A composition which is crosslinkable by means of condensation reactions, comprising at least one organopolysiloxane composition
   (A) prepared by reaction of components comprising:
   (a) essentially linear organopolysiloxanes terminated at both ends by Si-bonded hydroxy groups,
   (b) optionally, plasticizers,
   (c) at least one chain extender of the formula $$R^1{}_2NCR^6{}_2SiR^1(OR^2)_2 \qquad (I)$$

and/or partial hydrolysates thereof, where
   $R^1$ are identical or different and are each a monovalent, substituted or unsubstituted hydrocarbon radical,
   $R^2$ are identical or different and are each a monovalent, substituted or unsubstituted hydrocarbon radical and
   $R^6$ are identical or different and are each hydrogen or a monovalent, substituted or unsubstituted hydrocarbon radical,
   (d) one or more organic isocyanate deactivators,
   (e) optionally, one or more silanes of the formula $$R^3Si(OR^4)_3 \qquad (II)$$

and/or their partial hydrolysates, where
   $R^3$ is as defined for $R^1$,
   $R^4$ are identical or different and are each a monovalent, substituted or unsubstituted hydrocarbon radical or a —C(=O)—$R^5$ or —N=$CR^5{}_2$ radical and
   $R^5$ are identical or different and each have one of the meanings given for $R^2$, and
   (f) optionally, catalysts for accelerating the reaction of silane (e) with Si—OH groups,
   wherein said isocyanate deactivator is present in an amount of from 0.0084 to 0.2 weight percent based on components a) through f),
   and further comprising:
   (B) optionally, one or more crosslinkers having at least three Si—O bonded hydrolyzable radicals,
   (C) at least one condensation catalyst, and
   (D) at least one filler.

5. The composition of claim 4, further comprising adding an aminoalkylsilane adhesion promoter.

6. An organopolysiloxane composition prepared by reaction of components comprising:
   (a) essentially linear organopolysiloxanes terminated at both ends by Si-bonded hydroxy groups,
   (b) optionally, plasticizers,
   (c) at least one chain extender of the formula $$R^1{}_2NCR^6{}_2SiR^1(OR^2)_2 \qquad (I)$$

and/or partial hydrolysates thereof, where
   $R^1$ are identical or different and are each a monovalent, substituted or unsubstituted hydrocarbon radical,
   $R^2$ are identical or different and are each a monovalent, substituted or unsubstituted hydrocarbon radical and
   $R^6$ are identical or different and are each hydrogen or a monovalent, substituted or unsubstituted hydrocarbon radical,
   (d) one or more organic isocyanate deactivators,
   (e) optionally, one or more silanes of the formula $$R^3Si(OR^4)_3 \qquad (II)$$

and/or their partial hydrolysates, where
   $R^3$ is as defined for $R^1$,
   $R^4$ are identical or different and are each a monovalent, substituted or unsubstituted hydrocarbon radical or a —C(=O)—$R^5$ or —N=$CR^5{}_2$ radical and
   $R^5$ are identical or different and each have one of the meanings given for $R^2$, and
   (f) optionally, catalysts for accelerating the reaction of silane (e) with Si—OH groups,
   wherein said chain extender (c) is present in an amount such that the mol ratio of Si—OH groups of (a) to —OR² groups of (c) is greater than or equal to 1, and wherein said organic isocyanate deactivator is present in an amount of 0.0084 to 0.2 weight percent based on the weight of components a) through f).

7. The composition of claim 6, further comprising adding an aminoalkylsilane adhesion promoter.

8. An organopolysiloxane composition prepared by reaction of components comprising:
(a) essentially linear organopolysiloxanes terminated at both ends by Si-bonded hydroxy groups,
(b) optionally, plasticizers,
(c) at least one chain extender of the formula $$R^1{}_2NCR^6{}_2SiR^1(OR^2)_2 \quad (I)$$

and/or partial hydrolysates thereof, where
$R^1$ are identical or different and are each a monovalent, substituted or unsubstituted hydrocarbon radical,
$R^2$ are identical or different and are each a monovalent, substituted or unsubstituted hydrocarbon radical and
$R^6$ are identical or different and are each hydrogen or a monovalent, substituted or unsubstituted hydrocarbon radical,
(d) one or more organic isocyanate deactivators,
(e) optionally, one or more silanes of the formula $$R^3Si(OR^4)_3 \quad (II)$$

and/or their partial hydrolysates, where
$R^3$ is as defined for $R^1$,
$R^4$ are identical or different and are each a monovalent, substituted or unsubstituted hydrocarbon radical or a —C(=O)—$R^5$ or —N=$CR^5{}_2$ radical and
$R^5$ are identical or different and each have one of the meanings given for $R^2$, and
(f) optionally, catalysts for accelerating the reaction of silane (e) with Si—OH groups,
further comprising at least one stabilizer compound selected from the group consisting of acid phosphoric esters, phosphonic acids, and acid phosphonic esters, wherein said organic isocyanate deactivator is present in an amount of from 0.0084 to 0.2 weight percent based on components a) through f).

9. The composition of claim 8, wherein said stabilizer is present in an amount of from 0.01 weight percent to 1 weight percent based on the weight of organopolysiloxanes (a).

10. An organopolysiloxane composition prepared by reaction of components comprising:
(a) essentially linear organopolysiloxanes terminated at both ends by Si-bonded hydroxy groups,
(b) optionally, plasticizers,
(c) at least one chain extender of the formula $$R^1{}_2NCR^6{}_2SiR^1(OR^2)_2 \quad (I)$$

and/or partial hydrolysates thereof, where
$R^1$ are identical or different and are each a monovalent, substituted or unsubstituted hydrocarbon radical,
$R^2$ are identical or different and are each a monovalent, substituted or unsubstituted hydrocarbon radical and
$R^6$ are identical or different and are each hydrogen or a monovalent, substituted or unsubstituted hydrocarbon radical,
(d) one or more organic isocyanate deactivators,
(e) optionally, one or more silanes of the formula $$R^3Si(OR^4)_3 \quad (II)$$

and/or their partial hydrolysates, where
$R^3$ is as defined for $R^1$,
$R^4$ are identical or different and are each a monovalent, substituted or unsubstituted hydrocarbon radical or a —C(=O)—$R^5$ or —N=$CR^5{}_2$ radical and
$R^5$ are identical or different and each have one of the meanings given for $R^2$, and
(f) optionally, catalysts for accelerating the reaction of silane (e) with Si—OH groups, further comprising from 0.01 weight percent to 1 weight percent of octylphosphonic acid relative to the weight of organopolysiloxanes (a).

11. The process of claim 10, wherein the concentration of said isocyanate deactivator is from 0.0084% by weight to 0.2% by weight based on the weight of components a) through f).

* * * * *